(12) United States Patent
Oreifej et al.

(10) Patent No.: US 9,792,485 B2
(45) Date of Patent: Oct. 17, 2017

(54) SYSTEMS AND METHODS FOR COARSE-TO-FINE RIDGE-BASED BIOMETRIC IMAGE ALIGNMENT

(71) Applicant: Synaptics Incorporated, San Jose, CA (US)

(72) Inventors: Omar Oreifej, San Jose, CA (US); Kuntal Sengupta, Cupertino, CA (US); Adam Schwartz, San Jose, CA (US); Krishna Chinni, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 122 days.

(21) Appl. No.: 14/788,662

(22) Filed: Jun. 30, 2015

(65) Prior Publication Data

US 2017/0004341 A1 Jan. 5, 2017

(51) Int. Cl.
*G06K 9/00* (2006.01)
*G06K 9/36* (2006.01)
*G06K 9/62* (2006.01)

(52) U.S. Cl.
CPC ........... *G06K 9/001* (2013.01); *G06K 9/0004* (2013.01); *G06K 9/6202* (2013.01)

(58) Field of Classification Search
None
See application file for complete search history.

(56) References Cited

U.S. PATENT DOCUMENTS

| | | | |
|---|---|---|---|
| 5,325,449 A | 6/1994 | Burt et al. | |
| 5,649,032 A | 7/1997 | Burt et al. | |

(Continued)

FOREIGN PATENT DOCUMENTS

WO     WO 9307584 A1     4/1993

OTHER PUBLICATIONS

Yager, et al., "Coarse Fingerprint Registration Using Orientation Fields," *Journal on Applied Signal Processing*, 2005:13, 2043-2053 (2005).

(Continued)

*Primary Examiner* — Randolph I Chu
(74) *Attorney, Agent, or Firm* — Leydig, Voit & Mayer, Ltd.

(57) ABSTRACT

Systems and methods for aligning images are disclosed. A method includes: receiving a first skeletonized biometric image; generating a first coarse representation of the first skeletonized biometric image; identifying a set of candidate transformations that align the first skeletonized biometric image to a second skeletonized biometric image based on comparing transformed versions of the first coarse representation to a second coarse representation of the second skeletonized biometric image; selecting a first candidate transformation as the candidate transformation that minimizes a difference metric between a transformed version of the first skeletonized biometric image and the second skeletonized biometric image; and determining whether the first skeletonized biometric image transformed by the first candidate transformation matches the second skeletonized biometric image, wherein the first skeletonized biometric image transformed by the first candidate transformation matches the second skeletonized biometric image if the difference metric satisfies a threshold.

20 Claims, 5 Drawing Sheets

(56) References Cited

U.S. PATENT DOCUMENTS

| | | | |
|---|---|---|---|
| 5,991,430 A * | 11/1999 | Hsu | G06K 9/6211 |
| | | | 382/124 |
| 5,991,444 A | 11/1999 | Burt et al. | |
| 5,999,662 A | 12/1999 | Burt et al. | |
| 6,249,616 B1 | 6/2001 | Hashimoto | |
| 6,393,163 B1 | 5/2002 | Burt et al. | |
| 6,668,072 B1 | 12/2003 | Hribernig et al. | |
| 7,046,829 B2 * | 5/2006 | Udupa | G06K 9/00087 |
| | | | 340/5.53 |
| 7,085,403 B2 | 8/2006 | Ailisto et al. | |
| 7,142,699 B2 | 11/2006 | Reisman et al. | |
| 7,587,064 B2 | 9/2009 | Owechko et al. | |
| 7,599,530 B2 | 10/2009 | Boshra | |
| 7,609,866 B2 | 10/2009 | Fujii | |
| 7,616,787 B2 | 11/2009 | Boshra | |
| 7,672,528 B2 | 3/2010 | Gallagher et al. | |
| 7,809,211 B2 | 10/2010 | Taraba et al. | |
| 8,098,906 B2 | 1/2012 | Shuckers et al. | |
| 8,229,250 B2 | 7/2012 | Suzuki et al. | |
| 8,295,560 B2 | 10/2012 | Abiko | |
| 8,358,870 B2 | 1/2013 | Abiko | |
| 8,565,497 B2 | 10/2013 | Nada et al. | |
| 8,634,604 B2 | 1/2014 | Jahromi | |
| 8,723,953 B2 | 5/2014 | Klomp et al. | |
| 2004/0218790 A1 | 11/2004 | Lo | |
| 2004/0258284 A1 * | 12/2004 | Daniel | G06K 9/00087 |
| | | | 382/124 |
| 2010/0183230 A1 | 7/2010 | Huang | |
| 2014/0225902 A1 | 8/2014 | Zhu et al. | |
| 2014/0226879 A1 | 8/2014 | Westerman et al. | |
| 2014/0270420 A1 | 9/2014 | Boshra | |
| 2015/0007243 A1 | 1/2015 | Kunkel et al. | |

OTHER PUBLICATIONS

Yager, et al., "Fingerprint Alignment using a Two state Optimization," *Elsevier, Pattern Recognition Letters*, 27, 317-324 (2006).

Ong, et al., "Fingerprint Images Segmentation Using Two Stages Coarse to Fine Discrimination Technique," *LNAI 2903*, 624-633 (2003).

Cao, et al, "Segmentation and Enhancement of Latent Fingerprints: A Coarse to Fine Ridgestructure Dictionary", IEEE Trans. Pattern Anal. Mach. Intell., 36 (2) (2014).

"Pyramid (image processing)"—Wikipedia, downloaded from http://en.wikipedia.org/wiki/pyramid_(image_processing), download Feb. 26, 2015.

Adelson, et al., "Pyramid Methods in Image Processing," *RCA Engineer*, 29-6, pp. 33-41 (1984).

* cited by examiner

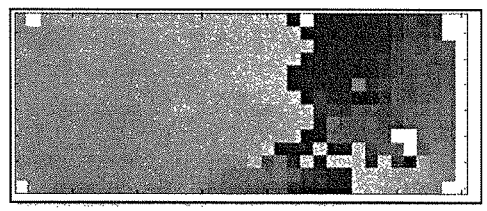
FIG. 4A                FIG. 4B
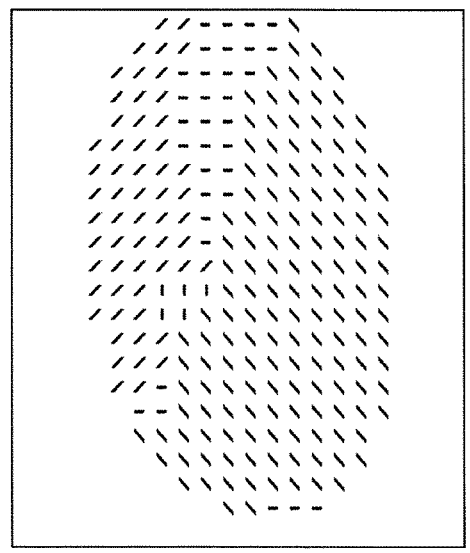
FIG. 5

SYSTEMS AND METHODS FOR COARSE-TO-FINE RIDGE-BASED BIOMETRIC IMAGE ALIGNMENT

FIELD

This disclosure relates generally to the field of biometrics and, more specifically, to systems and methods for coarse-to-fine ridge-based biometric image alignment.

BACKGROUND

Since its inception, biometric sensing technology, such as fingerprint sensing, has revolutionized identification and authentication processes. The ability to capture and store biometric data in a digital file of minimal size has yielded immense benefits in fields such as law enforcement, forensics, and information security.

Utilizing fingerprints in a biometric authentication process typically includes storing one or more fingerprint images captured by a fingerprint sensor as a fingerprint template for later authentication. During the authentication process, a newly acquired fingerprint image is received and compared to the fingerprint template to determine whether there is a match. Before the newly acquired fingerprint image can be compared to the fingerprint template, the newly acquired fingerprint image is aligned by performing a transformation to the newly acquired fingerprint image. The transformation may include one or more of rotation, translation (in two dimensions), and scaling of the newly acquired fingerprint image. This process is known as image alignment.

However, image alignment is a challenging problem when the newly acquired fingerprint image and the template image are low quality or if only a small part of one image overlaps with a sub-part of the other image. With increased use of smaller image sensors, the amount of overlap among the images is decreasing, which further decreases the effectiveness of conventional image alignment techniques. In addition, if a minutiae-based technique is used for image alignment or image matching, the use of smaller sensors decreases the number of minutiae points in the images, which decreases even further the effectiveness of conventional image alignment and image matching techniques.

Accordingly, there remains a need in the art for systems and methods for image alignment that address the deficiencies of conventional approaches.

SUMMARY

One embodiment of the disclosure provides a processing system, comprising: a processor; and, a memory storing instructions that, when executed by the processor, cause the processing system to align a first image to a second image, wherein the first and second images are biometric images, by performing the steps of: generating a first orientation map corresponding to the first image; determining a set of candidate transformations that, when applied to the first orientation map, align a transformed version of the first orientation map to a second orientation map corresponding to the second image; for each candidate transformation in the set of candidate transformations: applying the candidate transformation to the first image to generate a transformed first image, and calculating a difference metric between the transformed first image and the second image; and selecting a first candidate transformation from the set of candidate transformations that, when applied to the first image, minimizes the difference metric between the transformed first image and the second image.

Another embodiment of the disclosure provides a method comprising: receiving a first skeletonized biometric image; generating a first coarse representation of the first skeletonized biometric image; identifying a set of candidate transformations that align the first skeletonized biometric image to a second skeletonized biometric image based on comparing transformed versions of the first coarse representation to a second coarse representation of the second skeletonized biometric image; selecting a first candidate transformation from the set of candidate transformations as the candidate transformation that, when applied to the first skeletonized biometric image, minimizes a difference metric between a transformed version of the first skeletonized biometric image and the second skeletonized biometric image; and, determining whether the first skeletonized biometric image transformed by the first candidate transformation matches the second skeletonized biometric image, wherein the first skeletonized biometric image transformed by the first candidate transformation matches the second skeletonized biometric image if the difference metric satisfies a threshold.

Yet another embodiment of the disclosure provides a device, comprising a processing system configured to: receive a first skeletonized biometric image; generate a first coarse representation of the first skeletonized biometric image; identify a set of candidate transformations that align the first skeletonized biometric image to a second skeletonized biometric image based on comparing transformed versions of the first coarse representation to a second coarse representation of the second skeletonized biometric image; select a first candidate transformation from the set of candidate transformations as the candidate transformation that, when applied to the first skeletonized biometric image, minimizes a difference metric between a transformed version of the first skeletonized biometric image and the second skeletonized biometric image; and, determine whether the first skeletonized biometric image transformed by the first candidate transformation matches the second skeletonized biometric image, wherein the first skeletonized biometric image transformed by the first candidate transformation matches the second skeletonized biometric image if the difference metric satisfies a threshold.

BRIEF DESCRIPTION OF THE DRAWINGS

FIG. 4A illustrates a skeletonized fingerprint image that shows various ridges and minutiae of a fingerprint, according to one embodiment.

FIG. 4B illustrates an orientation map of the skeletonized fingerprint image shown in FIG. 4A, according to one embodiment.

FIG. 5 is another example of an orientation map, where different orientation values at different pixels locations are represented as short line segments, according to one embodiment.

DETAILED DESCRIPTION

Figure 1:
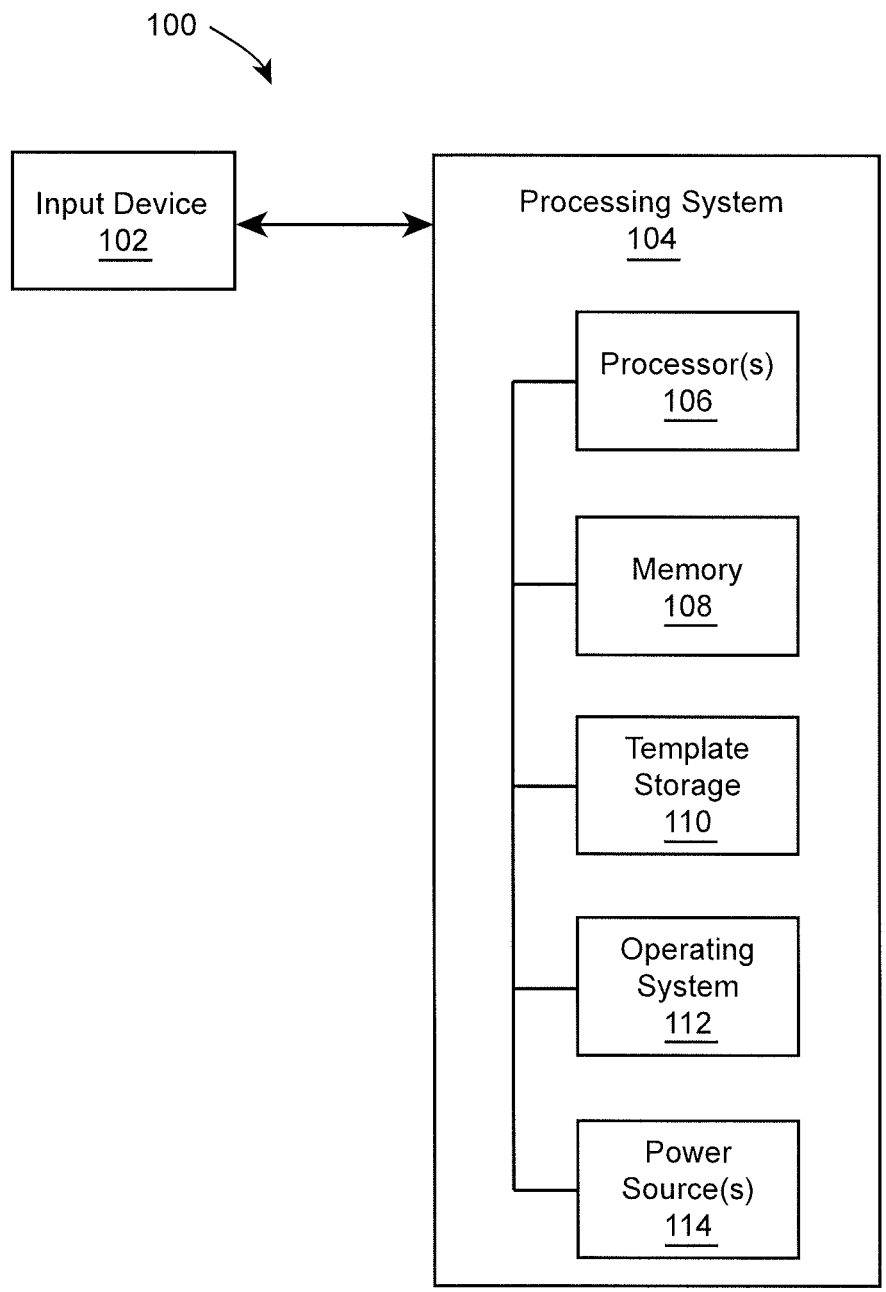
FIG. 1 is a block diagram of an example electronic system that includes an input device and a processing system, according to an embodiment of the disclosure.

Embodiments of the disclosure address the problem of image alignment for images having significant oriented texture or edges. Fingerprint images are examples of such images; however, iris images and vein patterns are other examples. As described, image alignment is a challenging problem when images are low quality or if only a small part of one image overlaps with a sub-part of another image, as is common when the images are captured using very small sensors.

In conventional approaches to fingerprint matching, minutiae points are detected in the images. The locations and corresponding orientations of the minutia points form the features of interest for each image being compared. The sets of minutia from the two images are aligned to one another using a voting procedure in Hough space based on each possible point-to-point correspondence between the two minutia sets, and the minutia points in the aligned minutia sets are compared to each other to determine whether they are a match. Unfortunately, these conventional fingerprint matching techniques rely on large numbers of minutia points to be present in the images, both for the alignment stage, as well as for the matching stage where the aligned images are compared to determine whether they were derived from the same user fingerprint. The use of smaller sensors decreases the number of minutiae points in the images, which decreases the effectiveness of these conventional image alignment and image matching techniques.

Embodiments of the disclosure provide image alignment techniques that can operate on small images with few or even no minutiae points in the overlap area of the two images. Given a first image to be aligned to a second image, embodiments of the disclosure perform image alignment using multiple stages. In some embodiments, the first and second images are skeletonized fingerprint images. Fingerprint skeletonization, also referred to as thinning, is the process of converting the ridge lines in a grayscale fingerprint image to a binary representation, and reducing the width of binarized ridge lines to one pixel wide.

At a first stage, coarse representations of the first and second images are generated. In some embodiments, the coarse representations may be orientation maps of the respective images. In other embodiments, the coarse representations may be density maps, phase maps, intensity maps, or any other suitable representation of the respective images. In some embodiments, the coarse representations are smoother representations of the images that can be but are not necessarily lower resolution (i.e., dimensions), as described in greater detail herein.

In a second stage, the coarse representations are smoothed and sampled to generate smaller dimension (i.e., lower resolution) coarse representations. In some embodiments, the smaller dimension coarse representations are further smoothed and sampled in third and subsequent stages.

Regardless of how many stages of smoothing and sampling are performed, a "pose search" is performed on the smallest coarse representations to determine the candidate transformations that best align the smallest coarse representation of the first image to the smallest coarse representation of the second image. In some embodiments, a pose search is a type of exhaustive search that examines all possibilities of transformations that can align a given image to another image. Since the smallest coarse representations are relatively smaller dimension images than the first and second images, the pose search can be done relatively quickly.

The pose search results in a first set of transformation hypotheses that best align the smallest coarse representation of the first image to the smallest coarse representation of the second image. For example, the results of the pose search are ranked according to a similarity measure and the top N transformation hypotheses are selected to be included in the first set transformation hypothesis.

Next, embodiments of the disclosure "wiggle" around the transformation hypotheses included in the first set of transformation hypotheses. Wiggling around a given transformation hypothesis, as used herein, comprises identifying additional transformation hypotheses that have transformation parameters that are within a neighborhood of the transformation parameters of a given transformation hypothesis in the first set of transformation hypotheses, for example within a threshold. For example, suppose a transformation hypothesis in the first set of transformation hypotheses is associated with an x-translation of +4 units, a y-translation of +6 units, and a rotation of +14 degrees (i.e., [+4, +6, +14.0], as an example shorthand notation). Additional "wiggle" transformation hypotheses can be generated for [+4.1, +6.1, +14.1] and [+3.9, +5.9, +13.9], for example (shown using the shorthand notation). Additional wiggle transformations are computed because the transformation solution computed from a lower resolution representation is likely to be close, but not exactly at, the best solution at the higher resolution representation in the next finer stage. Also, certain matching algorithms, such as ridge matching algorithms that are based on pixel-by-pixel differences between patterns in images, provide better results when there is very tight match between two images. While the first set of transformation hypotheses is determined using relatively coarse images, the best transformation hypotheses to match the higher resolution first and second images are likely to be close to the transformation hypotheses in the first set of transformation hypotheses.

The transformation hypotheses in the first set of transformation hypotheses, plus their additional wiggle transformation hypotheses, or a subset of these, are combined to form a second set of transformation hypotheses. The transformation hypotheses in the second set of transformation hypotheses are then evaluated at a next finer representation level. In some embodiments, the images at the coarsest representation level are smaller in terms of dimensions than the images at the next higher representation level. The transformation hypotheses in the second set of transformation hypotheses are applied to the coarse representations at the next higher representation level. The top M transformation hypothesis may be selected as forming a third set of transformation hypotheses.

The transformation hypotheses in the third set of transformation hypotheses are then evaluated at the next higher representation level, which may be the first and second images that are skeletonized fingerprint images. In some embodiments, for each transformation hypotheses in the third set of transformation hypotheses, an iterative closest point (ICP) process may be performed to minimize the difference between the first image transformed by the transformation hypotheses and the second image. The transformation hypothesis at the skeletonized fingerprint images that provides the minimum alignment distance is then selected as the best transformation hypothesis that aligns the first image to the second image. A fingerprint matching algorithm can then be executed on the aligned images to determine whether the transformed first image is a fingerprint match to the second image. In some cases, the ICP may be used in place of the "wiggle."

As described, embodiments of the disclosure provide an image matching technique that operates at multiple levels. A top level may be skeletonized ridge-based level, whereas the lower levels may be coarse representations (e.g., orientation maps). Although the example above includes two coarse representation levels, any number may be utilized. The disclosed technique operates via selecting the top candidates at the lowest level and then propagating those candidates up to the next level for further evaluation. The candidates are then evaluated at the next higher level, and new candidates are selected. This process continues until up uppermost level (e.g., skeletonized fingerprint image level) is reached. The candidate transformations are then adjusted using ICP at the highest level to determine the best alignment of the two images.

FIG. 1 is a block diagram of an example electronic system 100 that includes an input device 102 and a processing system 104, according to an embodiment of the disclosure. The basic functional components of the electronic device 100 utilized during capturing, storing, and validating a biometric authentication attempt are illustrated. The processing system 104 includes a processor(s) 106, a memory 108, a template storage 110, an operating system (OS) 112, and a power source(s) 114. Each of the processor(s) 106, the memory 108, the template storage 110, the operating system 112 and power source 114 are interconnected physically, communicatively, and/or operatively for inter-component communications.

As illustrated, processor(s) 106 are configured to implement functionality and/or process instructions for execution within electronic device 100 and the processing system 104. For example, processor 106 executes instructions stored in memory 108 or instructions stored on template storage 110 to determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110. According to various embodiments, the processor(s) 106 implement hardware and/or software to align two images and compare the aligned images to one another to determine whether there is a match, as described in greater detail below.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material.

Input device 102 can be implemented as a physical part of the electronic system 100, or can be physically separate from the electronic system 100. As appropriate, the input device 102 may communicate with parts of the electronic system 100 using any one or more of the following: buses, networks, and other wired or wireless interconnections. In some embodiments, input device 102 is implemented as a fingerprint sensor and utilizes one or more various electronic fingerprint sensing methods, techniques, and devices to capture a fingerprint image of a user. Input device 102 may utilize any type of technology to capture a biometric corresponding to a user. For example, in certain embodiments, the input device 102 may be an optical, capacitive, thermal, pressure, radio frequency (RF) or ultrasonic sensor.

Some non-limiting examples of electronic systems 100 include personal computers of all sizes and shapes, such as desktop computers, laptop computers, netbook computers, tablets, web browsers, e-book readers, and personal digital assistants (PDAs). Additional example electronic systems 100 include composite input devices, such as physical keyboards and separate joysticks or key switches. Further example electronic systems 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

As described in greater detail herein, embodiments of the disclosure provide systems and methods to match a newly acquired image with a template image, such as in the context of fingerprint matching. As part of the image matching process, the newly acquired image is first aligned to the template image.

Figure 2A:
FIG. 2A illustrates a grayscale fingerprint image that shows various ridges and minutiae of a fingerprint, according to one embodiment.
Figure 2B:
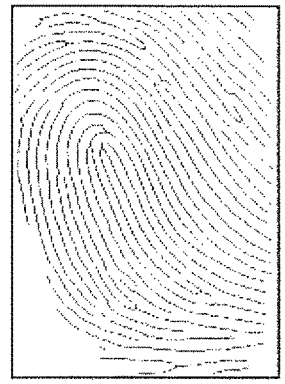
FIG. 2B illustrates a skeletonized version of the grayscale fingerprint image in FIG. 2A, according to one embodiment.

FIG. 2A illustrates a grayscale fingerprint image that shows various ridges and minutiae of a fingerprint, according to one embodiment. As can be seen in FIG. 2A, the image is noisy such that portions of the image are cloudy and the ridges or contours are broken. FIG. 2B illustrates a skeletonized version of the grayscale fingerprint image in FIG. 2A, according to one embodiment. Fingerprint skeletonization, also referred to as thinning, is the process of converting the ridge lines in a grayscale fingerprint image (see, for example, the image in FIG. 2A) to a binary representation, and reducing the width of the binarized ridge lines to one pixel wide. In a binary representation, each pixel may be considered either a foreground pixel or a background pixel that can be represented using a single bit. In a skeletonized fingerprint image, this corresponds to ridges and valleys of the fingerprint. As can be seen in FIG. 2B, the skeletonized version of the grayscale fingerprint image removes much of the noise so that the image is no longer cloudy and the ridge lines are no longer broken.

Figure 3A:
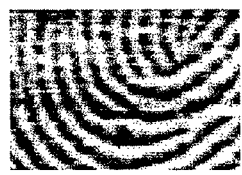
FIG. 3A illustrates a small grayscale fingerprint image that shows various ridges and minutiae of a portion of a fingerprint, according to one embodiment.
Figure 3B:
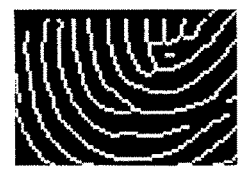
FIG. 3B illustrates a skeletonized version of the grayscale fingerprint image in FIG. 3A, according to one embodiment.

FIG. 3A illustrates a small grayscale fingerprint image that shows various ridges and minutiae of a portion of a fingerprint, according to one embodiment. As can be seen in FIG. 3A, the image is noisy such that portions of the image are cloudy and the ridges or contours are broken. Also, the image in FIG. 3A is much smaller than the image shown in FIG. 2A. This may be a result of, for example, using a smaller sensor to capture the image in FIG. 3A. FIG. 3B illustrates a skeletonized version of the grayscale fingerprint image in FIG. 3A.

FIG. 4A illustrates a skeletonized fingerprint image that shows various ridges and minutiae of a fingerprint, according to one embodiment. FIG. 4B illustrates an orientation map of the skeletonized fingerprint image shown in FIG. 4A, according to one embodiment. As described in greater detail herein, embodiments of the disclosure provide an image alignment technique where images to be aligned are converted to smoother representations, such as orientation maps, for example. Pixels in an orientation map represent the local orientation of the ridges passing through that area of the image. In one embodiment, the orientation values range from 0° to 180°. As shown in the example in FIG. 4B, the orientation map can be presented as a series of colors or grayscale shades, with the different colors or grayscale shades representing different orientation values. FIG. 5 is another example of an orientation map, where different orientation values at different pixels locations are represented as short line segments, according to one embodiment. As described in greater detail herein, the coarse representations of the images can be smoothed and sampled to generate smoother and smaller coarse representations (e.g., smaller dimension orientation maps). Each smaller orientation map provides a coarser representation of the image from the next higher level orientation map.

In one embodiment, image alignment is performed by first generating one or more levels of coarse representations of the images. Transformation hypotheses for aligning the lowest-level coarse representations are identified. The transformation hypotheses are propagated up to the next higher level and analyzed again at the next higher level to find transformation hypothesis for aligning the coarse representations at the next higher level. This process is repeated until the highest level is reached that includes the two images being aligned. The transformation hypotheses that reach the highest level are evaluated to determine which provides the best alignment of the two images.

Figure 6:
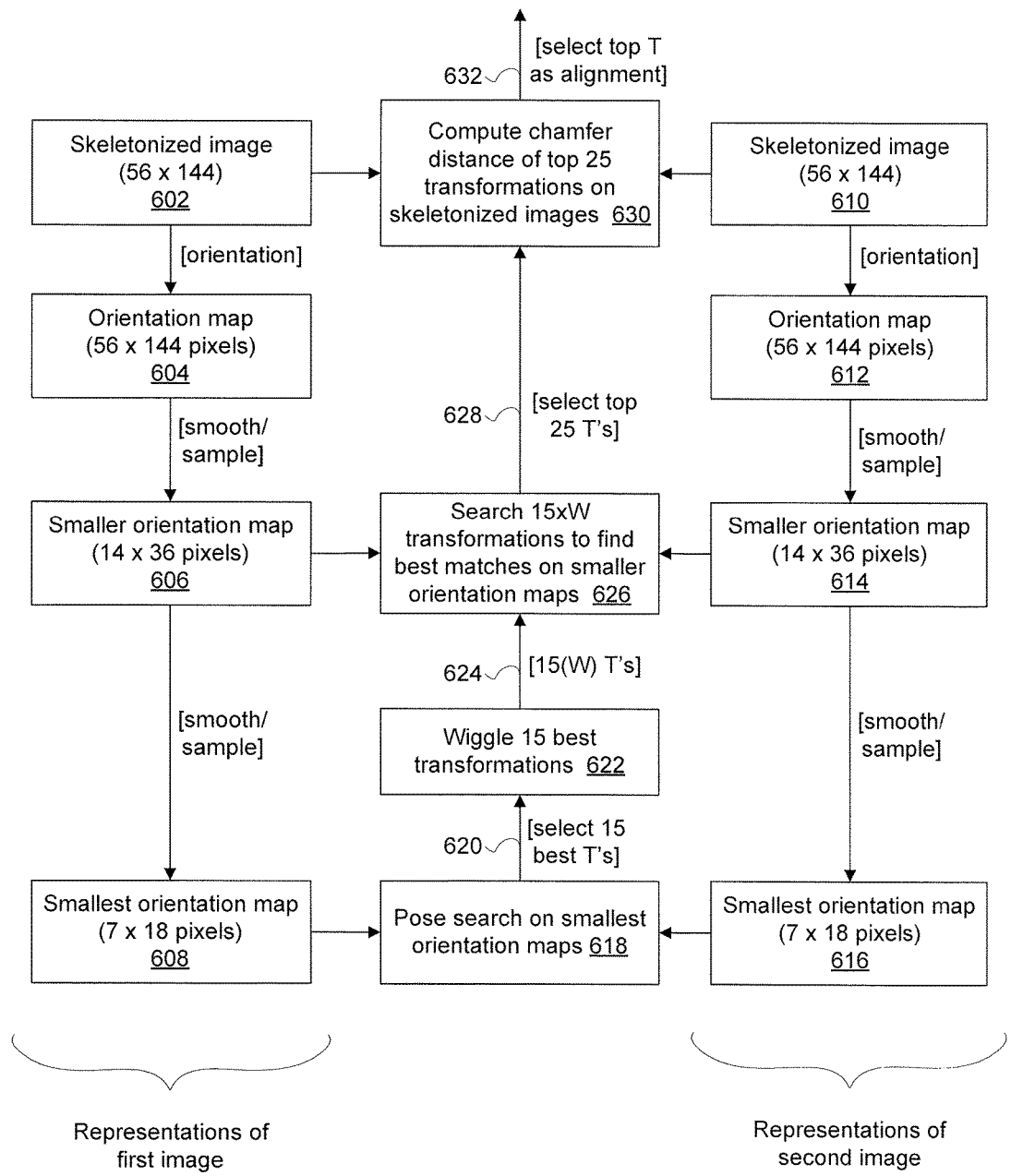
FIG. 6 is a block diagram illustrating a process for aligning two images using coarse representations of the images, according to one embodiment.

FIG. 6 is a block diagram illustrating a process for aligning two images using coarse representations of the images, according to one embodiment. In FIG. 6, a first image is being aligned to a second image. The left side of FIG. 6 shows representations of the first image. The right side of FIG. 6 shows representations of the second image.

The first image, which may be a grayscale fingerprint image captured by an image sensor, can be processed to generate a skeletonized image 602. The skeletonized image 602 has certain dimensions. In the example shown, the skeletonized image 602 has dimensions of 56×144 pixels, although these dimensions are merely example dimensions and are not limiting. The skeletonized image 602 is processed to generate an orientation map 604 of the first image.

In the example shown, the orientation map 604 has the same dimensions as the skeletonized image 602 (for example, 56×144 pixels). In some embodiments, the orientation map 604 is computed directly from a grayscale image of a fingerprint; whereas, in other embodiments, the orientation map 604 is computed from the skeletonized image 602.

The orientation map 604 is then smoothed and sampled to generate a smaller orientation map 606. In some embodiments, smoothing is performed on the orientation map 604 so as not to violate the Nyquist theorem. In the example shown, the smaller orientation map 606 has dimensions of 14×36 pixels, which again are merely example dimensions and are not limiting. The smaller orientation map 606 is then smoothed and sampled to generate a smallest orientation map 608. In some embodiments, smoothing is performed on the smaller orientation map 606 so as not to violate the Nyquist theorem. In the example shown, the smallest orientation map 608 has dimensions of 7×18 pixels, which again are merely example dimensions and are not limiting. In the example shown in FIG. 6, the orientation maps are smoothed and sampled twice (i.e., two stages of smoothing/sampling), but in other embodiments any number of smoothing/sampling stages may be performed. Also, it should be noted that the label "smallest" (as in "smallest orientation map 608") is merely a label, and it is possible to have even smaller representations of the first image that have smaller dimensions than the "smallest orientation map 608," as so-named in FIG. 6. The example dimensions included in FIG. 6 are merely illustrative and are not limiting. Any dimensions can be used depending on implementation. For example, the skeletonized images 602, 610 may have the same dimensions as the orientation maps 604, 612. The smaller orientation maps 606, 614 may have dimensions that are 4 times smaller than the orientation maps 604, 612, and the smallest orientation maps 608, 616 may have dimensions that are two times smaller than the smaller orientation maps 606, 614. Other dimensions are also within the scope of the disclosure.

Similar to the processing done to the first image, the same processing is performed to the second image. The second image is processed to generate a skeletonized image 610. The skeletonized image 610 has dimensions of 56×144 pixels. The skeletonized image 610 is processed to generate an orientation map 612 of the second image. In the example shown, the orientation map 612 has the same dimensions as the skeletonized image 610 (i.e., 56×144 pixels). The orientation map 612 then smoothed and sampled to generate a smaller orientation map 614 having dimensions of 14×36 pixels. The smaller orientation map 614 is then smoothed and sampled to generate a smallest orientation map 616 having dimensions of 7×18 pixels.

The smallest orientation map 608 of the first image and the smallest orientation map 616 of the second image are then input to a pose search operator 618 executed by a processing system. The pose search operator 618 performs a pose search (e.g., an exhaustive search) on the smallest orientation map 608 of the first image to identify candidate transformations that align the smallest orientation map 608 of the first image to the smallest orientation map 616 of the second image. Because the smallest orientation maps 608, 616 are relatively small (e.g., 7×18 pixels), the number of possible combinations to search to find the best transformation is relatively small. Other embodiments may include rules to skip over portions of the search space that are far away from good alignments.

At 620, the top N best transformations that align the smallest orientation map 608 of the first image to the smallest orientation map 616 of the second image are selected. In the example shown, N is 15. The top N best transformations are input into a wiggle operator 622. The wiggle operator 622 receives the N transformations and generates additional transformations that are close the N transformations. Each parameter value (e.g., x-translation, y-translation, rotation) of a given transformation is wiggled within a given threshold to identify additional transformations that are close to the given transformation. For each transformation, suppose W additional transformations are generated via the wiggle operator 622. Thus, if N=15, the number of transformations output 624 by the wiggle operator is about N×W, or 15×W transformations.

The 15×W transformations are then input into an operator 626 that also receives the smaller orientation map 606 of the first image and the smaller orientation map 614 of the second image. The operator 626 applies each of the 15×W transformations to the smaller orientation map 606 of the first image to identify the top M transformations of the 15×W transformations that best align the smaller orientation map 606 of the first image to the smaller orientation map 614 of the second image. In some embodiments, the x- and y-translation values included in the 15×W transformations are scaled appropriately to account for the larger dimension of the smaller orientation maps 606, 614. At operator 626, a pose search (e.g., exhaustive search) is not performed. Instead, only the 15×W transformations are analyzed, which greatly reduces the number of transformations that are analyzed that this stage compared to performing an exhaustive search at this stage. The top M transformations are output 628 from the operator 626. In the example shown, M is 25.

The M=25 transformations are then input into an operator 630 that also receives the skeletonized image 602 and the skeletonized image 610. The operator 630 applies each of the M transformations to the skeletonized image 602 to identify the single best transformation of the M transformations that best aligns the skeletonized image 602 to the skeletonized image 610. The single best transformation is then output 632 by the operator 630. In some embodiments, an iterative closest point (ICP) process may be performed to minimize the difference between the skeletonized image 602 transformed by a given transformation and the skeletonized image 610. In one embodiment, to perform an ICP process given two point sets (e.g., point sets of fingerprint ridges), $P=\{p_1, p_2, p_3, \ldots, p_X\}$ and $Q=\{q_1, q_2, q_3, \ldots q_Y\}$, the processing system finds the rigid transformation that minimizes the sum of squared error, as follows:

$$E(R, t) = \frac{1}{N}\sum_{i=0}^{N-1} \|p_i - Rq_i - t\|^2,$$

where $p_i$ and $q_i$ are corresponding points, and N is the total number of corresponding points.

At operator 630, a pose search (e.g., exhaustive search) is not performed. Instead, only the M=25 transformations are analyzed, which greatly reduces the number of transformations that are analyze that this stage compared to performing an exhaustive search.

The single best transformation that is output 632 by the operator 630 is then applied to the first image to align the first image to the second image. Once the first image is aligned with the second image, the processing system can perform an analysis to determine whether the aligned first image matches the second image, such as whether there is a fingerprint match.

In some embodiments, a measure of alignment between images and/or a fingerprint match is determined by calculating a chamfer distance. Calculating a chamfer distance comprises computing a measure of difference between two images. In general, to compute a chamfer distance, a processing system extracts the edge/contours of a query image as well as the edge/contours of a target image, takes one point/pixel of contour in the query image and finds a distance of a closest point/pixel of contour in target image, and computes a sum the distances for all edge points/pixels of query image.

Figure 7:
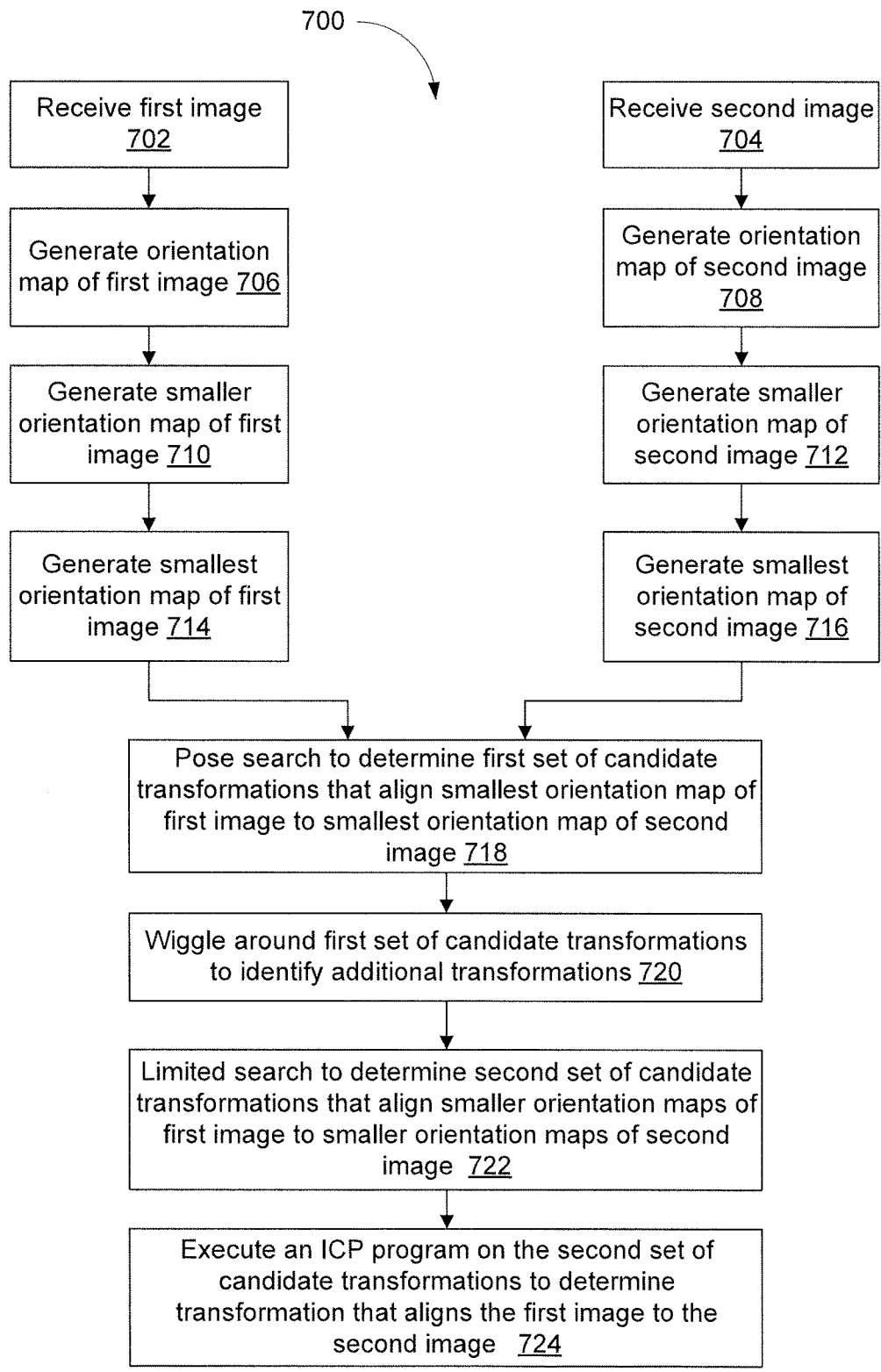
FIG. 7 is a flow diagram of a method for aligning two images, according to one embodiment of the disclosure.

FIG. 7 is a flow diagram of a method 700 for aligning two images, according to one embodiment of the disclosure. At step 702, a processing system receives a first image. At step 704, the processing system receives a second image. In some embodiments, the first image is a newly acquired image captured by an image sensor, and the second image is a template image that was previously acquired to which the first image is to be compared to determine whether there is a match.

In some embodiments, each of the first and second images are skeletonized biometric images. As such, appropriate pre-processing (not shown) may be performed to convert a grayscale image, such as a fingerprint image, to a skeletonized image. In some embodiments, converting the second image (i.e., the template image) to a skeletonized format is pre-computed by the processing system once and does not need to be recomputed each time that a newly acquired image is presented to compare to the second image.

At step 706, the processing system generates an orientation map of the first image. In some embodiments, the orientation map of the first image has the same dimensions as the first image. At step 708, the processing system generates an orientation map of the second image. In some embodiments, the orientation map of the second image has the same dimensions as the second image.

At step 710, the processing system generates a smaller orientation map of the first image based on the orientation map of the first image. In some embodiments, the smaller orientation map of the first image is a smoothed and sampled version of the orientation map of the first image. As such, the smaller orientation map of the first image has smaller dimensions than the orientation map of the first image. Similarly, at step 712, the processing system generates a smaller orientation map of the second image based on the orientation map of the second image.

At step 714, the processing system generates a smallest orientation map of the first image based on the smaller orientation map of the first image. In some embodiments, the smallest orientation map of the first image is a smoothed and sampled version of the smaller orientation map of the first image. As such, the smallest orientation map of the first image has smaller dimensions than the smaller orientation map of the first image. Similarly, at step 716, the processing system generates a smallest orientation map of the second image based on the smaller orientation map of the second image.

In the example shown in FIG. 7, two stages of smoothing/sampling are performed. In other embodiments, any number of one or more smoothing/sampling stages can be performed. Also, it should be noted that the label "smallest" (as in "smallest orientation map of the first image") is merely a label, and it is possible to have even smaller representations of the first image that have smaller dimensions than the "smallest orientation map of the first image," as so-named in FIG. 7.

In addition, although steps 702/706/710/714 are shown to be performed in parallel with steps 704/708/712/716, in other embodiments, steps 702, 704, 706, 708, 710, 712, 714, 716 can be performed serially or in any technically feasible order. Also, in some embodiments, steps 704/708/712/716 related to the second image can be pre-computed by the processing system and are not recomputed each time that a newly acquired fingerprint image is received.

At step 718, the processing system performs a pose search to determine a first set of candidate transformations that align the smallest orientation map of the first image (i.e., computed at step 714) to the smallest orientation map of the second image (i.e., computed at step 716). Performing a pose search, as used herein, involves testing each different transformation that can be applied to the smallest orientation map of the first image by brute force, also referred to as an exhaustive search. Since the smallest orientation maps have small dimensions, the number of possible transformations to search is relatively small, as compared to performing a pose search on the first and second images directly, which are larger images.

At step 720, the processing system "wiggles" around the candidate transformations in the first set of candidate transformations to identify additional transformations. Each additional transformation that is identified has transformation parameters (e.g., x-translation, y-translation, rotation) that are within certain thresholds of the transformation parameters of one or more of the candidate transformations in the first set of candidate transformations.

At step 722, the processing system performs a limited search to determine a second set of candidate transformations that align the smaller orientation map of the first image to the smaller orientation map of the second image. The search at step 722 is "limited" because only the candidate transformations in the first set of candidate transformations and their corresponding "wiggles" are evaluated on the smaller orientation map of the first image. Doing so limits the number of transformations that are evaluated, as compared to performing a pose search (i.e., exhaustive search) on the smaller orientation map of the first image.

At step 724, the processing system executes an iterative closest point (ICP) program on each candidate transformations in the second set of candidate transformations to identify the candidate transformation that aligns the first image and the second image. As described, each of the candidate transformations in the second set of candidate transformations is applied to the first image, which is a skeletonized biometric image. The result is compared to the second image, which is also a skeletonized biometric image. A single transformation that results in the best alignment between the first image transformed by a candidate transformation and the second image is selected as the transformation that aligns the first image and the second image. Once the first image is aligned with the second image, the processing system can perform an analysis to determine whether the first image matches the second image, such as whether there is a fingerprint match. In some embodiments, the first image transformed by the transformation matches the second image if the difference metric is below a threshold amount.

Advantageously, embodiments of the disclosure provide an image alignment technique that can operate on relatively small images, such as those that have no minutiae points in common. Also, because an exhaustive search is performed only on the smallest coarse representation, and is not performed on the relatively larger skeletonized images, compute time needed to align the images is reduced.

The embodiments and examples set forth herein were presented in order to best explain the present disclosure and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A processing system, comprising:
a processor; and
a memory storing instructions that, when executed by the processor, cause the processing system to align a first image to a second image, wherein the first and second images are biometric images, by performing the steps of:
generating a first orientation map corresponding to the first image, wherein the first orientation map is an image in which each pixel of the image represents a local orientation of an area of the first image covered by the pixel;
determining a set of candidate transformations that, when applied to the first orientation map, align a transformed version of the first orientation map to a second orientation map corresponding to the second image;
for each candidate transformation in the set of candidate transformations:
applying the candidate transformation to the first image to generate a transformed first image, and calculating a difference metric between the transformed first image and the second image; and
selecting a first candidate transformation from the set of candidate transformations that, when applied to the first image, minimizes the difference metric between the transformed first image and the second image.

2. The processing system of claim 1, wherein the steps further include:
determining whether the first image transformed by the first candidate transformation matches the second image, wherein the first image transformed by the first candidate transformation matches the second image if the difference metric satisfies a threshold.

3. The processing system of claim 2, wherein the first and second images are skeletonized biometric images, and determining that the first image transformed by the first candidate transformation matches the second image comprises determining a fingerprint match based on a difference between contours in the skeletonized biometric images.

4. The processing system of claim 1, wherein each of the candidate transformations comprises a translation value and a rotation value.

5. The processing system of claim 1, wherein determining the set of candidate transformations comprises:
for each transformation in a set of possible transformations that can be applied to the first orientation map, applying the transformation to the first orientation map and comparing the transformed version of the first orientation map to the second orientation map; and
determining the set of candidate transformations based on selecting a number of transformations from the set of possible transformations that result in a minimum difference between the transformed version of the first orientation map and the second orientation map.

6. The processing system of claim 1, wherein the steps further include:
sampling the first orientation map to generate a first coarse orientation map;
sampling the second orientation map to generate a second coarse orientation map; and
determining a set of coarse candidate transformations to align the first coarse orientation map to the second coarse orientation map;
wherein determining the set of candidate transformations comprises:
for each coarse candidate transformation in the set of coarse candidate transformations:
applying the coarse candidate transformation to the first orientation map to generate a transformed first orientation map,
calculating a difference metric between the transformed first orientation map and the second orientation map, and
determining the set of candidate transformations based on selecting a number of coarse candidate transformations that result in a minimum difference between the transformed first orientation map and the second orientation map.

7. The processing system of claim 6, wherein determining the set of coarse candidate transformations to align the first coarse orientation map to the second coarse orientation map comprises:
for each transformation in a set of possible transformations that can be applied to the first coarse orientation map, applying the transformation to the first coarse orientation map and comparing a transformed version of the first coarse orientation map to the second coarse orientation map; and
identifying an initial set of hypothesis transformations based on similarity metrics resulting from applying each of the transformations in the set of possible transformations to the first coarse orientation map and comparing the transformed version of the first coarse orientation map to the second coarse orientation map; and
identifying additional hypothesis transformations to add to the initial set of hypothesis transformations based on the additional hypothesis transformations being within a threshold of at least one hypothesis transformation in the initial set of hypothesis transformations.

8. The processing system of claim 1, wherein selecting the first candidate transformation from the set of candidate transformations that minimizes the difference metric between the transformed first image and the second image comprises:
for each candidate transformation, performing an iterative closest point (ICP) operation to minimize a difference between the first image transformed by the candidate transformation and the second image.

9. The processing system of claim 1, wherein the first orientation map has the same dimensions as the first image.

10. The processing system of claim 1, wherein the first orientation map has dimensions that are smaller than dimensions of the first image.

11. The processing system of claim 1, wherein the first orientation map is generated based on a grayscale image corresponding to the first image.

12. The processing system of claim 1, wherein the first image represents a portion of a fingerprint.

13. A method, comprising:
receiving a first skeletonized biometric image;
generating a first coarse representation of the first skeletonized biometric image, wherein the first coarse representation is an image in which each pixel of the image represents a local orientation of an area of the first skeletonized biometric image covered by the pixel;
identifying a set of candidate transformations that align the first skeletonized biometric image to a second skeletonized biometric image based on comparing transformed versions of the first coarse representation to a second coarse representation of the second skeletonized biometric image;
selecting a first candidate transformation from the set of candidate transformations as the candidate transformation that, when applied to the first skeletonized biometric image, minimizes a difference metric between a transformed version of the first skeletonized biometric image and the second skeletonized biometric image; and determining whether the first skeletonized biometric image transformed by the first candidate transformation matches the second skeletonized biometric image, wherein the first skeletonized biometric image transformed by the first candidate transformation matches the second skeletonized biometric image if the difference metric satisfies a threshold.

14. The method of claim 13, wherein the first coarse representation comprises an orientation map of the first skeletonized biometric image.

15. The method of claim 13, wherein the first coarse representation comprises a density map of the first skeletonized biometric image.

16. The method of claim 13, wherein the first skeletonized biometric image represents a portion of a fingerprint.

17. A device, comprising:
a processing system configured to:
  receive a first skeletonized biometric image;
  generate a first coarse representation of the first skeletonized biometric image, wherein the first coarse representation is an image in which each pixel of the image represents a local orientation of an area of the first skeletonized biometric image covered by the pixel;
  identify a set of candidate transformations that align the first skeletonized biometric image to a second skeletonized biometric image based on comparing transformed versions of the first coarse representation to a second coarse representation of the second skeletonized biometric image;
  select a first candidate transformation from the set of candidate transformations as the candidate transformation that, when applied to the first skeletonized biometric image, minimizes a difference metric between a transformed version of the first skeletonized biometric image and the second skeletonized biometric image; and
  determine whether the first skeletonized biometric image transformed by the first candidate transformation matches the second skeletonized biometric image, wherein the first skeletonized biometric image transformed by the first candidate transformation matches the second skeletonized biometric image if the difference metric satisfies a threshold.

18. The device of claim 17, further comprising:
a biometric sensor configured to capture an image of a fingerprint,
wherein the processing system is further configured to process the image of the fingerprint to generate the first skeletonized biometric image.

19. The device of claim 17, wherein the first coarse representation comprises an orientation map of the first skeletonized biometric image.

20. The device of claim 17, wherein the first coarse representation comprises a density map of the first skeletonized biometric image.

* * * * *